United States Patent Office 3,323,864
Patented June 6, 1967

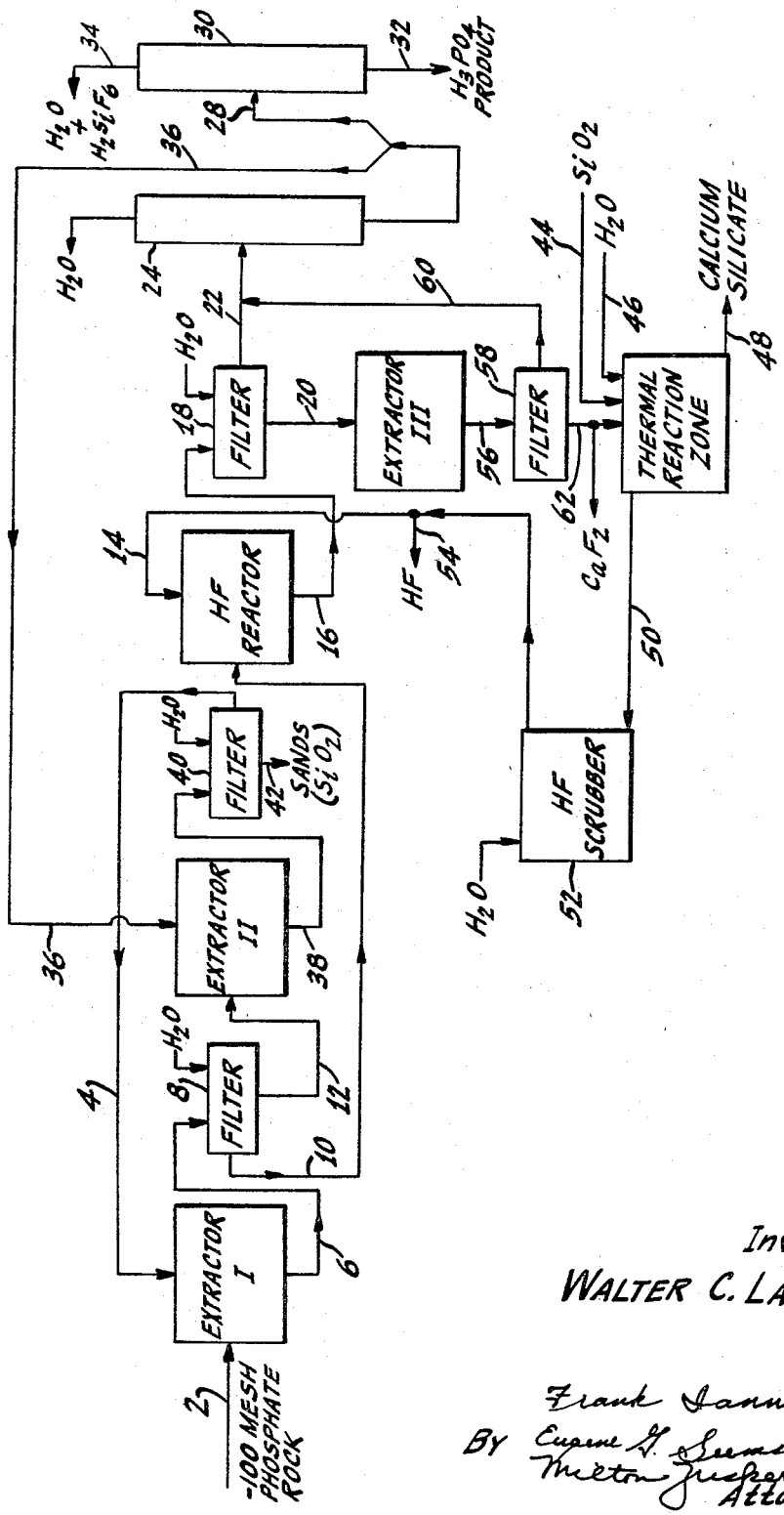
Inventor:
WALTER C. LAPPLE

3,323,864
PRODUCTION OF PHOSPHORIC ACID FROM A PHOSPHATIC ORE
Walter C. Lapple, Mountainside, N.J., assignor to FMC Corporation, New York, N.Y., a corporation of Delaware
Filed Aug. 29, 1963, Ser. No. 305,293
9 Claims. (Cl. 23—165)

This invention relates to the recovery of phosphorus values from phosphatic ores in the form of phosphoric acid and the simultaneous production of hydrogen fluoride and a calcium silicate as valuable by-products.

It is known that phosphate rock, which generally contains phosphorus in the form of $Ca_{10}F_2(PO_4)_6$ can be acidulated with sulfuric acid to recover phosphoric acid by means of the "wet acid" process. The resulting phosphoric acid product, termed "Green acid," is suitable for use in fertilizer applications, but is not suitable for most other applications because of its high impurity level. This process has many additional drawbacks in addition to yielding a relatively impure phosphoric acid product; among these is the fact that the two major by-products of the process, low grade calcium sulfate and fluosilicic acid, do not have extensive markets, and thus create severe disposal problems.

One method for overcoming the problems of acidulation with sulfuric acid is taught in U.S. Patent No. 2,636,806, issued to E. A. Winter on Apr. 28, 1953. The process is carried out by acidulating phosphate rock containing silica with hydrofluosilicic acid ($H_2SiF_6$), also termed fluorosilicic acid, to obtain calcium fluosilicate and phosphoric acid as products of the reaction. The calcium fluosilicate is separated from the phosphoric acid by evaporating the solution and crystallizing the calcium salt. The resultant phosphoric acid solution is then heated to volatilize any remaining hydrofluosilicic acid. This process also has serious drawbacks in that it is difficult to crystallize the calcium fluosilicate from the phosphoric acid solution on a plant scale by merely volatilizing water from the hot phosphoric acid solution without encountering serious operational difficulties. This is due to the high solubility of $CaSiF_6 \cdot 2H_2O$ in $H_2SiF_6$ present in the phosphoric acid solution, which hinders recovery by crystallization. Thus, precipitation of the calcium fluosilicate from its phosphoric acid solution is not easily achieved. Another and most objectionable drawback to Winter's process is that an outside source of fluorine must be available since about ⅓ of the fluorine values of the phosphate rock is removed as calcium fluoride. The remaining fluorine values which are converted to fluosilicic acid are not sufficient to maintain the fluorine balance within the system, and must be supplemented from an outside source.

Additional processes have also been suggested in which acidulation of the phosphate rock is carried out with other mineral acids, including hydrofluoric acid. A hydrofluoric acid-based process is generally impractical for commercial operation because the rate of rock attack with an acid of practical strength is too slow and because of the high cost of this acid.

It is an object of the present invention to produce phosphoric acid in a relatively pure form from phosphate rock by acid extraction using acids which are derived solely from the phosphate rock, and recovering valuable calcium silicate by-products.

This and other objects will become apparent from the following disclosure.

I have found that a relatively pure phosphoric acid can be recovered from phospate rock by:

(a) treating the rock with aqueous phosphoric acid in amounts sufficient to solubilize the calcium values of said rock and to convert the original calcium phosphate values into calcium phosphates which are soluble in the dilute aqueous acid, (b) separating the resultant calcium phosphate solution from solid silicious impurities and other insolubles, (c) reacting the aqueous calcium phosphate solution with hydrofluoric acid to form insoluble calcium fluoride and phosphoric acid, and (d) separating the phosphoric acid solution, containing both the phosphoric acid used to dissolve the rock and the phosphoric acid derived therefrom as product from the insoluble calcium fluoride.

I have further found that the hydrofluoric acid employed in step (c) can be supplied almost entirely from the calcium fluoride recovered from step (d), preferably by reaction with silicon dioxide and steam in a reaction zone at temperatures above about 1000° C.; the products obtained are hydrogen fluoride and a calcium silicate, such as tricalcium silicate, which is useful in the manufacture of Portland cement. Additional hydrogen fluoride, over what is needed to replace losses, can be generated in this reaction by feeding fluosilicic acid generated in the process.

By means of this process, both acids used in the process, i.e., hydrofluoric acid and phosphoric acid, can be obtained from the phosphate rock; further, in place of undesired waste products of the wet acid process, e.g., calcium sulfate, I obtain valuable by-products, e.g., a calcium silicate cement feed or a synthetic wollastonite and hydrofluoric acid.

The invention will now be described with respect to the attached drawing, which is a flow sheet of the present process. In the drawing, phosphate rock, whose phosphate values are contained principally in the form of

$$Ca_{10}F_2(PO_4)_6$$

and which has been crushed to —100 mesh is fed into Extractor I through line 2. The crushed rock in Extractor I is then treated with a phosphoric acid-calcium phosphate liquor which enters Extractor I through line 4. In Extractor I, phosphate values are converted to soluble calcium phosphates; and most of the fluorine values in the ore are converted to fluosilicic acid, which remains in solution with the calcium phosphate. Thereafter, the slurry is passed to filler 8 through line 6 where the insoluble residues containing silicon dioxide and some calcium phosphate values are separated from the extractant liquor. The filter cake is washed with water and the washings are combined with the filtrate. The insolubles or sands, separated in filter 8, are passed through line 12 to Extractor II where they are treated with phosphoric acid from line 36. The $P_2O_5$ values which remain in the sands residue from filter 8 are converted to soluble calcium phosphates by the phosphoric acid extraction solution in Extractor II. The resultant slurry from Extractor II is then passed through line 38 into filter 40 for separation of the insolubles from the phosphoric acid ($H_3PO_4$) liquor filtrate. The filter cake in filter 40 is washed with water and the washings are combined with the filtrate. The resulting insolubles, which comprise mainly silicon dioxide ($SiO_2$) are removed through line 42 and may be discarded or may be employed to supply $SiO_2$ to the thermal reaction zone.

The liquor filtrate from filter 8 is passed through line 10 into the hydrogen fluoride (HF) reactor. Hydrofluoric acid is passed into the HF reactor through line 14 and a reaction ensues between the calcium phosphates and the hydrogen fluoride in which phosphoric acid and insoluble calcium fluoride ($CaF_2$) are produced without affecting the fluosilicic acid ($H_2SiF_6$). After completion of the reaction, the slurry is passed into filter 18 through line 16 where the insoluble residue containing calcium fluoride ($CaF_2$) is removed through line 20 while a filtrate of phosphoric acid solution containing fluosilicic acid is removed through line 22. The filter cake containing calcium fluoride is then washed with water and the washings are combined with the filtrate.

The separated $CaF_2$ is then repulped and extracted with water in Extractor III to remove any residual $H_3PO_4$. The resultant slurry is then passed into filter 58 through line 56 to separate the $H_3PO_4$ extractor from the residual $CaF_2$. The extract is passed through line 60 and combined with the $H_3PO_4$ filtrate from filter 18 in line 22. The residual $CaF_2$ is then passed through line 62 either wholly or in part to a thermal reaction zone for recovery of the fluorine values.

The $H_3PO_4$ filtrate from filter 18 in combination with the washings from line 60, is passed into still 24 through line 22. In the still 24, the concentration of the $H_3PO_4$ is increased to the desired strength by evaporation of some of the water overhead. The resulting $H_3PO_4$ solution, which may be at a concentration of about 32%, is removed from still 24 through line 26 and divided into two streams. One of the streams enters column 30 through line 28 where the acid is further concentrated to produce a commercial grade 75% $H_3PO_4$. This is recovered as product from the base of column 30 through line 32. Overhead, water and the $H_2SiF_6$ are removed through line 34. The other stream of $H_3PO_4$ recovered from still 24 is passed via line 36 to Extractor II for further extraction of the insoluble residues (sands) from filter 8.

The calcium fluoride ($CaF_2$) which is recovered from filter 58 is passed wholly or in part through line 62 to the thermal reaction zone. In addition, silicon dioxide ($SiO_2$) is added to the thermal reaction zone through line 44 along with water (steam) through line 46. The steam values can be supplied wholly or in part by combustion of hydrocarbon fuel. If desired, the $SiO_2$ which is fed into the thermal reaction zone may be obtained wholly or in part from the extracted sands which are removed from filter 40 by line 42. These sands are made up chiefly of $SiO_2$ with minor amounts of other impurities. These ingredients are heated in the thermal reaction zone to temperatures of about 1000° C. to about 1400° C. to produce hydrogen fluoride gas and a calcium silicate product. The ratio of calcium to silica in the product may vary from about 3:1 or less depending upon the ratio of silicon dioxide and calcium fluoride which are introduced into the thermal reaction zone. The calcium silicate product is removed via line 48 while the hydrogen fluoride gas is removed overhead through line 50 and passed to HF scrubber 52. Water is used to scrub the hydrogen fluoride gas by passing the two streams in contact with one another; the hydrogen fluoride gas is absorbed in the water to form hydrofluoric acid, and is removed by line 14 and passed into the HF reactor for reaction with acid-soluble calcium phosphate in the manner heretofore described. Excess hydrofluoric acid may be recovered as product from line 54.

In carrying out the above-described process, phosphate rock, which normally contains phosphorus values in the form of $Ca_{10}F_2(PO)_6$ is ground to about −100 mesh and is extracted with $H_3PO_4$ passing countercurrently to the flow of the phosphate rock in a two-step procedure. The $H_3PO_4$ initially contacts a filter cake of sands containing residual phosphate values, in Extractor II, to remove substantially all of the residual $P_2O_5$ values from the sands. The sands are obtained on filtration of previously extracted phosphate rock in Extractor I as described hereinafter. The extracted sands are then separated from the extraction liquor by conventional means, e.g., a filter or centrifuge. These sands from Extractor II which are recovered in filter 40 may be added to the thermal reactor to supply $SiO_2$ values, if desired. The phosphoric acid liquor extract, which now contains calcium phosphate extracted from the sands in Extractor II is passed into Extractor I for extraction of −100 mesh fresh phosphate rock.

The phosphoric acid extracting liquor used in Extractors I and II has $H_3PO_4$ concentrations of from about 20 to about 75%. Phosphoric acid of concentrations less than 20% is not economically desirable because of the slow rate of dissolution of the phosphate rock and the increased cost of concentrating the phosphoric acid product. Additionally, phosphoric acid in concentrations over 40% increases process difficulties in subsequent steps. The preferred phosphoric acid concentration is from about 25 to 40%.

The phosphate rock and sands are treated with phosphoric acid liquor in Extractors I and II respectively, at temperatures of from about ambient to about 100° C. in order to solubilize the calcium and phosphorus salts. The extraction time varies depending upon the temperature, $H_3PO_4$ concentration and ratio of acid to rock. In general, extraction periods up to 8 hours in each stage have been found sufficient. In these extraction steps, the insoluble phosphate values from the rock are converted into acid-soluble calcium phosphates which may be represented by the following equations:

(I) $Ca_{10}F_2(PO_4)_6 + 14H_3PO_4 \rightarrow 10Ca(H_2PO_4)_2 + 2HF$ 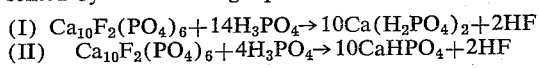
(II) $Ca_{10}F_2(PO_4)_6 + 4H_3PO_4 \rightarrow 10CaHPO_4 + 2HF$ Any HF in the extracting solution then converts to soluble fluosilicic acid ($H_2SiF_6$) by reaction with silica from the rock as follows:

(III) $6HF + SiO_2 \rightarrow H_2SiF_6 + 2H_2O$ 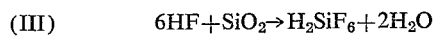

The phosphoric acid extracting liquor normally is employed in Extractors I and II in amounts greater than necessary to dissolve all of the calcium and phosphate values. Excess phosphoric acid is desirable because he extracting liquor thus retains the high extraction powers throughout the period it is in contact with the phosphate rock and sands. In addition, large amounts of phosphoric acid in the extracting liquor are helpful in maintaining the calcium phosphate in solution during subsequent stages of the process. It is important that the calcium phosphate remain dissolved in the extracting liquor in order to avoid loss of phosphorus values in the remaining insolubles.

The resulting solution of phosphoric acid-calcium phosphate containing insoluble matter from Extractor I is then passed by line 6 to a separation stage. In the separation stage, the suspended solids (sands) comprise silica, some $P_2O_5$ values and impurities, are removed from the phosphoric acid-calcium phosphate liquor by a conventional liquid-solid separator 8 such as a filter or centrifuge. The sands are then passed by line 12 to Extractor II for removal of any $P_2O_5$ values as described above.

The phosphoric acid-calcium phosphate liquor from filter 8 is then passed into an HF reactor along with at least about stoichiometric amounts of hydrofluoric acid with respect to the calcium content.

Excess hydrofluoric acid is necessary to precipitate additional impurities along with the calcium. However, a large excess of hydrofluoric acid is undesirable since it would be carried over into the phosphoric acid mother liquor and would complicate subsequent processing. The hydrofluoric acid can be employed in any desired concentrations but is generally present in maximum concentrations of about 38%; this value represents the azeotropic composition of the $H_2O$–HF system at atmospheric pressure and is the maximum concentration of hydrofluoric acid which can be obtained by water adsorption of hydrogen fluoride gas produced in a subsequent thermal reaction zone. Higher concentrations of hydrofluoric acid can be employed, but these would require additional hydrofluoric acid concentrating steps and are not economically justified.

The reaction in the HF reactor can take place in one or more stages with the phosphoric acid-calcium phosphate liquor and hydrogen fluoride flowing countercurrently to one another. The reaction can take place at temperatures of from ambient to 100° C. and generally is completed in periods up to about 4 hours. The reaction may be represented by the following equation:

(IV) $3CaH_4(PO_4)_2 + 6HF \rightarrow 3CaF_2 + 6H_3PO_4$

The $CaF_2$ precipitates rapidly from the remainder of the solution. It is helpful if a slight excess of hydrofluoric acid is present during the reaction since this eases subsequent filtration of the $CaF_2$. One method of having excess hydrofluoric acid present during the greater portion of the reaction without employing hydrogen fluoride in greater than stoichiometric amounts is to meter in the entire phosphoric acid-calcium phosphate liquor at a slower rate than the stoichiometric quantity of hydrofluoric acid solution. Another method is to add the phosphoric acid-calcium phosphate liquor to the hydrofluoric acid solution instead of the reverse sequence of addition.

The separation of suspended matter from the phosphoric acid-calcium phosphate liquor prior to the addition of hydrofluoric acid is generally desirable with most low-grade ores in order to obtain an acceptably pure $CaF_2$ product and to avoid undesirable consumption of hydrofluoric acid. In the absence of this preceding separatory stage, hydrofluoric acid treatment of calcium phosphate liquor containing suspended impurities often yields a mass of dark, fine, slimey precipitate containing $CaF_2$ which is exceedingly difficult to separate from the remaining reaction liquor.

The resulting mixture of $H_3PO_4$ and insoluble $CaF_2$ is then passed from the HF reactor into a separator 18 to remove the water-insoluble fluoride from the phosphoric acid solution. The separation can be affected by conventional liquid-solid separators such as a filter or centrifuge. The resultant phosphoric acid solution, which has an increased phosphoric acid content due to the liberation of phosphoric acid during the preceding reaction, is recovered as the filtrate and may be sent to a concentrator 24 for evaporation of some of the water therein. The phosphoric acid is recovered from the concentrator at the concentration desired for subsequent extraction, e.g., from 25–40% $H_3PO_4$. A portion is removed through line 28 for work-up as product. The remainder of the phosphoric acid is passed through line 36 to Extractor II for extraction of the filter cake sands from filter 8 in the manner above described.

The product acid which is recovered from the concentrator through line 26 generally has a strength of less than about 40% $H_3PO_4$. In order to increase the strength of the acid to a commercially acceptable product, i.e. 75% $H_3PO_4$, the acid is concentrated by evaporation of a portion of the water in still 30. During this concentration, the fluosilicic acid, which has accompanied the soluble phosphate since the extraction stage, is removed overhead. A portion or all of this fluosilicic acid can be sent to the thermal reaction zone, hereinafter described, to recover the fluorine values as hydrogen fluoride. By this means, fluorine may be added to the system to make up process losses of fluorine values, and hydrogen fluoride may be made for sale or other use. An alternate method for removing fluosilicic acid from the final phosphoric acid is to add an alkali base or alkali salt, e.g. sodium carbonate, in order to precipitate the fluosilicic acid in the form of its insoluble alkali salt, e.g. $Na_2SiF_6$. This salt may also be returned to the thermal reaction zone for recovery of the fluorine values.

When the reaction in the HF reactor is carried out in a single step reactor, the calcium fluoride cake which is separated from the phosphoric acid on filter 18 is treated to remove any remaining phosphoric acid remaining in the $CaF_2$ cake, e.g. by $H_2O$ extraction in Extractor III. The resultant slurry is separated by conventional means, e.g. filter 58, and the extract is combined with the $H_3PO_4$ solution in line 22 through line 60. The $CaF_2$ filter cake is removed through line 62 and combined with silicon dioxide and steam in a thermal reactor at temperatures of from about 1000° C. to 1400° C. to produce hydrogen fluoride:

(V) $3CaF_2 + 3H_2O + 3XSiO_2 \rightarrow 3CaO \cdot 3XSiO_2 + 6HF$ where X has a value greater than $\frac{1}{3}$.

When fluosilicic acid is added to the reactor, hydrogen fluoride is produced according to the following equation:

(VI) $CaF_2 + H_2SiF_6 + 3H_2O \rightarrow CaO \cdot SiO_2 + 8HF$

If desired, the extracted sands from filter 40, which are made up mostly of silicon dioxide, can be used to supply all or a portion of the silicon dioxide required in the thermal reactor for production of hydrogen fluoride. If the amount of calcium fluoride obtained from the HF reactor is over and above the amount necessary to maintain the hydrogen fluoride balance in the system, a portion can be withdrawn as a fluospar by-product; the remainder is sent to the thermal reactor to be converted to hydrogen fluoride. The hydrogen fluoride gas which is obtained from the thermal reactor can be condensed or scrubbed with water to form hydrofluoric acid in HF scrubber 52 for use in the HF reactor of the present process. Alternatively, if the amount of hydrofluoric acid which is formed is greater than that required in the HF reactor, a portion may be withdrawn through line 54 as by-product.

The thermal reactor employed for conversion of $CaF_2$ to HF may be any suitable high-temperature reactor such as a rotary kiln or a fluid bed. In one mode of the invention, the ingredients are pre-agglomerated in the desired ratios of $CaO/SiO_2$ with a binder and then reacted in either a heated fluid bed reactor, rotary kiln, or other heated vessel. In the case of a fluid bed reactor, which is the preferred mode of operation, it is possible to react a physical blend of the ingredients in situ by feeding the calcium fluoride and silicon dioxide into a bed of preformed granules and using an auxiliary binder to provide the degree of stickiness required to form fluidized particles. One such binder which has being found suitable is soda ash when introduced in amounts of about 2–3% by weight of the feed.

In carrying out this preferred mode of operation, calcium silicate particles having a size from about $-10$ to about $+35$ mesh are used to make up the fluidized bed. The bed is maintained in a fluid condition by passing a hydrocarbon gas and air upward through the bed at a velocity sufficient to fluidize the bed. Generally, the fluidized gas is introduced at substantially above the minimum fluidizing velocity to maintain the bed in a high degree of agitation sufficient to overcome any stickiness of the fluidized particles. The introduction of the fluidizing gas into the bed at space velocities from about 4 to about 7 feet per second has been found satsifactory. Heat is supplied to the fluid bed by combustion of the fluidizing gas in the bed.

A feed mixture of calcium fluoride, silica, and an auxiliary binder, all in finely divided from, e.g. $-150$ mesh, is then continually added to the bottom of the fluidized bed along with recycled seed nuclei, preferably in the fluidizing gas stream. The relatively low, melting auxiliary binder, such as soda ash, is introduced into the bottom of the bed along with the silica and calcium fluoride to obtain the desired degree of stickiness on the surface of the fluidized particles. The calcium fluoride and silica fines adhere in a thin layer on the surface of the fluidized calcium silicate particles. Water vapor, which is introduced into the bed by virtue of the hydrocarbon combustion or from an outside source, reacts with the thin layer of calcium fluoride and silica to form hydrogen fluoride and calcium silicate. This reaction is facilitated by having the calcium fluoride and silicon dioxide present as thin layers on the surface of the calcium silicate particles. That is, the water can readily contact the calcium fluoride and silicon dioxide reagents because it can readily penetrate and diffuse into the thin calcium fluoride-silicon dioxide layer to permit a rapid and complete reaction.

As the calcium silicate particles build up in a size to a maximum of about −4 mesh, a portion of −4 +35 mesh particles are continuously removed from the fluid bed reactor through an overflow pipe, preferably located at the top of the fluid bed. The nominal retention time of these particles in the bed is on the order of about 2 hours. A portion of these −4 +35 mesh overflow particles are removed as product while the remaining portion is crushed to −10 mesh. The −10 mesh fraction is screened to obtain a −10 +35 mesh fraction which is recycled back to the reactor in an amount of about 20% by weight of the calcium fluoride-silicon dioxide feed, to supply new seed nuclei to the fluidized bed. The seed nuclei are introduced with the feed mixture, preferably in the fluidized gas stream. These seeds in turn grow in size within the fluid bed by the deposition of calcium silicate layers on the surface of the seeds as a result of the reaction of calcium fluoride and silicon dioxide with water.

The temperatures required in the reactor depends on the mole ratio of $CaO/SiO_2$ in the feed mixture. Generally, at $CaO/SiO_2$ mole ratios of 1:1, substantially complete conversion is obtained at temperatures of about 1150° C. Under these conditions, the resultant calcium silicate product is wollastonite. When $CaO/SiO_2$ mole ratios of 3:1 are employed, temperatures on the order of about 1300° C. or higher are necessary to get high conversion. One difficulty which arises in the use of high $CaO/SiO_2$ mole ratios is that there is a tendency towards fusion of the particles. To avoid this, it is possible to first heat such mixtures at temperatures of about 1150° C. to convert the bulk of the fluorine values to hydrogen fluoride and then heat to higher temperatures of 1350° C. to complete the $CaF_2$ conversion at $CaO/SiO_2$ mole ratios of 3:1. The resulting tricalcium silicate is suitable as a cement clinker.

The following examples are given by way of illustration of the present invention only and are not deemed to be limitative thereof.

*Example I*

Fifteen hundred and fifteen grams of an extracting liquor, recovered from a previous run, made up of phosphoric acid and calcium phosphates was found to contain on analysis:

|  | Percent |
|---|---|
| $P_2O_5$ | 20.16 |
| CaO | 1.25 |
| $SiO_2$ | 0.82 |
| $F_2$ | 1.85 |
| $H_2SiF_6$ | 1.97 |

This extracting liquor was reacted with 100 grams of −150 mesh phosphate rock having the following composition:

|  | Percent |
|---|---|
| $P_2O_5$ | 33.19 |
| CaO | 47.40 |
| $SiO_2$ | 5.97 |
| $F_2$ | 4.01 |
| $Fe_2O_3$ | 0.99 |
| $Al_2O_3$ | 1.57 |
| MgO | 0.26 |

The reaction was carried out by heating the extracting liquor to 50–55° C., adding the crushed rock to the liquor and stirring the mixture for 5 minutes. Thereafter, the slurry was heated to 70–75° C. by the injection of live steam for 1½ minutes. The temperature was maintained at 70–75° C. for another 2 minutes. Agitation of the slurry was continued for a total of 8 minutes. Thereafter, the slurry was permitted to stand for 4 minutes and then was passed into a vacuum filter for a total of about 25 minutes, during which time heat was applied to maintain the temperature of the slurry between 40–50° C. The resultant filter cake (sands) was washed with 100 grams of wash liquor from a previous cycle having the following analysis:

|  | Percent |
|---|---|
| $P_2O_5$ | 1.2 |
| CaO | 0.04 |
| $F_2$ | 0.11 |
| $H_2SiF_6$ | 0.05 |
| $SiO_2$ | 0.02 |

The washing took place over a period of about 2 minutes and the resultant wash water was combined with the filtrate. The total filtrate, including the added wash water, weighed 1610 grams. Thereafter, the filter cake (sands) was additionally washed with 79 grams of wash liquor having the same analysis as given previously and 100 grams of water. These washes were collected separately and the filter cake (sands) was removed and found to weigh 31.0 grams after standing for 24 hours. The 1610 grams of extracting liquor, having an increased calcium phosphate content, was found to have a yellow-brown color and was passed through a filter cake of activated carbon. The carbon filter cake was then washed with 50 grams of wash liquor obtained above and an additional 75 grams of water. These washings were combined with the filtrate to form a total of 1615 grams of a clear, nearly colorless solution. Twenty-four grams of this solution was withdrawn for analysis and analyzed as follows:

|  | Percent |
|---|---|
| $P_2O_5$ | 18.87 |
| CaO | 3.19 |
| $F_2$ | 1.75 |
| $H_2SiF_6$ | 1.91 |

The carbon cake was further washed with the remaining wash liquor plus 75 grams of water and a total of 211 grams of wash liquor was collected separately.

The remaining 1591 grams of the extracting liquor was reacted with 152.1 grams of 24% hydrofluoric acid in the following manner. The extracting liquor was heated to 65° C. and was added to the hydrofluoric acid, which was at room temperature in a polyethylene vessel, over a 1 minute period with gentle stirring. The reaction was permitted to proceed for 1 minute without agitation and then was filtered on a steam heated porcelain filter for 12 minutes. The resulting calcium fluoride cake which remained on the filter was washed with 170 grams of water over a period of 6 minutes and the resulting wash water was combined with the filtrate. The total filtrate recovered was $H_3PO_4$ and had a weight of 1629 grams and a density of 21° Bé. (about 20% $P_2O_5$). A calcium fluoride filter cake was removed from the filter, reslurried with 250 grams of water, heated to 70° C. and filtered. The cake was then additionally washed with 100 grams of water and total filtrate washings weighing 384 grams were recovered. These washings were added to the 1629 grams of phosphoric acid previously recovered and the total was evaporated to yield a 24° Bé. phosphoric acid solution at 20° C. After this concentration, the total acid solution weighed 1422 grams.

Thirty two grams of this acid was removed as product acid and was found to contain on analysis:

|  | Percent |
|---|---|
| $P_2O_5$ | 20.37 |
| CaO | 0.50 |
| $F_2$ | 2.12 |
| $H_2SiF_6$ | 2.31 |
| $SiO_2$ | 0.96 |
| $Fe_2O_3$ | 0.022 |
| $Al_2O_3$ | 0.038 |

The product acid was mixed with 0.82 gram of soda ash and a precipitate of $Na_2SiF_6$ was obtained. The slurry was filtered and the filtrate was found to contain on analysis:

| | Percent |
|---|---|
| $P_2O_5$ | 20.37 |
| CaO | 0.50 |
| $F_2$ | 0.05 |
| $H_2SiF_6$ | 0.01 |

The resultant calcium fluoride cake was dried overnight at 55° C. and weighed 71.7 grams. Upon analysis, it was found to contain the following components:

| | Percent |
|---|---|
| $P_2O_5$ | 2.11 |
| CaO | 60.98 |
| $F_2$ | 44.28 |
| $Fe_2O_3$ | 1.06 |
| $Al_2O_3$ | 1.78 |

The remaining 1390 grams of the 24° Bé. phosphoric acid was heated to 50–55° C. and was added to the 31.0 grams of filter cake (sands), recovered from the first extraction stage for extraction of additional $P_2O_5$ values. The slurry was agitated for 5 minutes and allowed to stand for an additional 3 to 4 minutes before being filtered. The residual filter cake was washed with 211 grams of wash liquor. This wash liquor was recovered from the previous washing of the carbon filter cake used to decolorize the extraction liquor. The filtrates were combined and a total of 1606 grams of extraction liquor was recovered. Twenty-five grams of this liquor was taken for analysis leaving 1581 grams for a succeeding cycle. The liquor analyzed:

| | Percent |
|---|---|
| $P_2O_5$ | 18.86 |
| CaO | 1.24 |
| $F_2$ | 1.91 |
| $H_2SiF_6$ | 2.11 |
| $SiO_2$ | 0.88 |

The filter cake from the second extraction stage (extracted sands) was further washed with 150 grams of water which was recovered separately and held for a succeeding cycle. The filter cake from the second extraction stage (extracted sands) was dried overnight at 55° C. It weighed 8.4 grams and had the following analysis:

| | Percent |
|---|---|
| $P_2O_5$ | 0.84 |
| CaO | 10.59 |
| $F_2$ | 12.50 |
| $Fe_2O_3$ | 1.22 |
| $Al_2O_3$ | 5.25 |
| $SiO_2$ | 53.30 |

On the basis of the analysis of the extracted sands, over 99% of the $P_2O_5$ values of the rock sample was extracted; the $P_2O_5$ values available for recovery in the extracting solution were 95.2% of $P_2O_5$ values present in the rock.

*Example 2*

A succeeding cycle was run in the same manner as in Example 1 except that no intermediate samples were removed for analysis during the run. A total of 126 grams of phosphoric acid was recovered having the following analysis:

| | Percent |
|---|---|
| $P_2O_5$ | 20.44 |
| CaO | 0.54 |
| $F_2$ | 2.14 |
| $H_2SiF_6$ | 2.18 |

The phosphoric acid was mixed with 3.03 grams of soda ash and a precipitate of $Na_2SiF_6$ was obtained. The slurry was filtered and the filtrate was found to contain on analysis:

| | Percent |
|---|---|
| $P_2O_5$ | 20.43 |
| CaO | 0.54 |
| $F_2$ | 0.06 |
| $H_2SiF_6$ | 0.01 |

In this cycle, the phosphoric acid yield was 77.5% of the $P_2O_5$ which was present in the original phosphate rock.

*Example 3*

The following example demonstrates the ability to recover fluorine values from a calcium fluoride source in yields sufficient to produce the hydrofluoric acid required for producing phosphoric acid by the present process. An initial charge of 3200 grams of −10 +35 mesh sand was introduced into a laboratory fluid bed made up of a tubing having a 4 inch I.D. and a length of 30 inches. The fluid bed tubing was positioned within an outer cylinder; the major heat requirement was supplied by burning propane within the annular space made up by the outer surface of the fluid bed tubing and the outer cylinder. A gas stream of air and propane was passed upward at a rate of 5–7 feet per second through the bottom of the tubing to fluidize the bed and supply heat. The bed was heated gradually by external and internal combustion of propane until it reached about 1125° C.

At this point, a continuous feed of calcium fluoride and silica mixture was introduced into the fluid bed. The composition of the $CaF_2/SiO_2$ mixture was regulated to maintain the mole ratio of $CaO/SiO_2$ at about 0.67. The calcium fluoride portion of the feed analyzed:

| | Percent |
|---|---|
| CaO | 68.76 |
| $SiO_2$ | 1.50 |
| $F_2$ | 48.9 |

In addition, sodium carbonate was added in an amount of about 2½% by weight of the feed in order to control agglomeration within the fluid bed. Simultaneously, there was also introduced into the fluid bed, overflow seeds of calcium silicate-silica particles. A total of 5143 grams of the $CaF_2$ and $SiO_2$ feed mixture was fed into the bed during the run.

The water required to convert the calcium fluoride to hydrogen fluoride was supplied by combustion of the propane in the bed. The charge was treated in the fluid bed for about 2 hours and hydrogen fluoride was evolved overhead. The residue analyzed:

| | Percent |
|---|---|
| CaO | 31.28 |
| $SiO_2$ | 58.7 |
| $F_2$ | 0.067 |
| $Na_2O$ | 0.47 |

This resulted in a 99.7% elimination of fluorine from the calcium fluoride.

Pursuant to the requirements of the patent statutes, the principle of this invention has been explained and exemplified in a manner so that it can be readily practiced by those skilled in the art, such exemplification including what is considered to represent the best embodiment of the invention. However, it should be clearly understood that, within the scope of the appended claims, the invention may be practiced by those skilled in the art, and having the benefit of this disclosure, otherwise than as specifically described and exemplified herein.

What is claimed is:

1. Process for recovering phosphoric acid from a phosphate-containing ore which comprises
   (a) mixing said ore with a phosphoric acid extracting solution in amounts sufficient to dissolve all the calcium values in said ore and to convert said phosphate values to acid-soluble calcium phosphates,
   (b) separating the resultant phosphoric acid-calcium phosphate extract from solid residues,
   (c) reacting said phosphoric acid-calcium phosphate extract with hydrofluoric acid to convert said calcium phosphate to calcium fluoride and phosphoric acid, and
   (d) separating an enriched phosphoric acid solution as product from said calcium fluoride.

2. Process of claim 1 wherein said phosphoric acid employed in step (a) has a concentration of from about 20% to about 40% by weight, and said hydrofluoric acid has a concentration of from about 20% to about 38% by weight.

3. Process of claim 1 wherein said phosphate rock and said phosphoric acid are mixed in step (a) at temperatures from about 20° C. to about 100° C., and reaction in step (c) takes place at temperatures of from about 20° C. to about 100° C.

4. Process of recovering phosphoric acid from a phosphate-containing ore which comprises
   (a) mixing said ore with a phosphoric acid extracting solution in amounts sufficient to dissolve the calcium values in said ore and to convert said phosphate values to acid-soluble calcium phosphates.
   (b) separating the resulting phosphoric acid-calcium phosphate extract from solid residues,
   (c) reacting said phosphoric acid-calcium phosphate extract with hydrofluoric acid and converting said calcium phosphate to calcium fluoride and phosphoric acid,
   (d) separating an enriched phosphoric acid solution from said calcium fluoride,
   (e) reacting said calcium fluoride with steam and silicon dioxide in a thermal reaction zone at temperatures of from about 1000° C., to 1400° C. to produce hydrogen fluoride and a calcium silicate residue,
   (f) recovering said hydrogen fluoride in water to form hydrofluoric acid,
   (g) recycling said hydrofluoric acid to said reaction stage (c),
   (h) extracting the phosphate values of the solid residues from step (b) with a portion of the phosphoric acid produced in step (d),
   (i) recycling said phosphoric acid extract solution to reaction stage (a) to dissolve additional phosphate containing ore, and
   (j) withdrawing the remainder of the phosphoric acid from step (d) as product.

5. Process of claim 4 wherein said phosphoric acid has a concentration of from about 20% to about 40% by weight and said hydrofluoric acid has a concentration of from about 20% to about 38% by weight.

6. Process of claim 4 wherein said phosphate rock and said phosphoric acid are mixed in step (a) at temperatures of from about 20° to about 100° C. and said reaction in step (c) takes place at temperatures of from about 20° C. to about 100° C.

7. Process of claim 4 in which said solid residues of step (b) are employed to supply a portion of said silicon dioxide values to said thermal reaction zone.

8. Process of claim 4 in which said enriched phosphoric acid solution from step (d) is distilled and a mixture of steam and fluosilicic acid is removed overhead and a concentrated phosphoric acid product substantially free of fluorides is recovered.

9. Process of claim 8 in which the fluosilicic acid is passed into the thermal reaction zone for conversion to hydrogen fluoride.

References Cited
UNITED STATES PATENTS

| | | | |
|---|---|---|---|
| 2,531,977 | 11/1950 | Hammaren et al. | 23—165 X |
| 3,017,246 | 1/1962 | Kamlet | 23—153 |
| 3,116,971 | 1/1964 | Hrishikesan et al. | 23—110 X |
| 3,151,938 | 10/1964 | Seidman | 23—109 |

OSCAR R. VERTIZ, *Primary Examiner.*

A. GRIEF, *Assistant Examiner.*

UNITED STATES PATENT OFFICE
CERTIFICATE OF CORRECTION

Patent No. 3,323,864                          June 6, 1967

Walter C. Lapple

It is hereby certified that error appears in the above numbered patent requiring correction and that the said Letters Patent should read as corrected below.

Column 1, line 69, for "phospate" read -- phosphate --; column 2, line 44, for "filler" read -- filter --; column 6, line 39, for "being" read -- been --; line 56, for "from" read -- form --; column 7, line 2, for "-mesh " read -- 4 mesh --; column 8, line 66, for "2.12" read -- 2.13 --; column 11, line 8, after "and" insert -- said --.

Signed and sealed this 13th day of August 1968.

(SEAL)
Attest:

Edward M. Fletcher, Jr.                                            EDWARD J. BRENNER
Attesting Officer                                                       Commissioner of Patents